United States Patent
Adam et al.

(10) Patent No.: US 9,384,719 B2
(45) Date of Patent: Jul. 5, 2016

(54) GENERATING CUSTOMIZED ARPEGGIOS IN A VIRTUAL MUSICAL INSTRUMENT

(71) Applicant: Apple Inc., Cupertino, CA (US)

(72) Inventors: Christof Adam, Norderstedt (DE); Markus Sapp, Appen-Etz (DE)

(73) Assignee: Apple Inc., Cupertino, CA (US)

(*) Notice: Subject to any disclaimer, the term of this patent is extended or adjusted under 35 U.S.C. 154(b) by 232 days.

(21) Appl. No.: 13/941,918

(22) Filed: Jul. 15, 2013

(65) Prior Publication Data
US 2015/0013532 A1    Jan. 15, 2015

(51) Int. Cl.
   *G10H 1/28* (2006.01)
   *G10H 7/00* (2006.01)
   *G10H 1/00* (2006.01)
   *G10H 1/26* (2006.01)
   *G09B 15/02* (2006.01)

(52) U.S. Cl.
   CPC ............. *G10H 1/28* (2013.01); *G09B 15/023* (2013.01); *G10H 1/0025* (2013.01); *G10H 1/26* (2013.01); *G10H 2220/106* (2013.01)

(58) Field of Classification Search
   CPC ......... G10H 1/28; G10H 1/0025; G10H 1/26; G09B 15/023
   USPC ..................... 84/638, 609, 611, 622
   See application file for complete search history.

(56) References Cited

U.S. PATENT DOCUMENTS

| | | | | |
|---|---|---|---|---|
| 4,191,081 A | * | 3/1980 | Deutsch | G10H 1/28 84/663 |
| 4,294,155 A | * | 10/1981 | Turner | G10H 7/002 84/345 |
| 4,926,737 A | * | 5/1990 | Minamitaka | G10H 1/0025 84/611 |
| 5,099,740 A | * | 3/1992 | Minamitaka | G10H 1/0025 84/651 |
| 5,714,705 A | * | 2/1998 | Kishimoto | G10H 1/42 84/611 |
| 5,898,120 A | * | 4/1999 | Kira | G10H 1/28 84/638 |
| 5,973,253 A | * | 10/1999 | Hirata | G10H 3/186 84/609 |
| 6,051,771 A | * | 4/2000 | Iizuka | G10H 1/28 84/622 |
| 6,121,532 A | * | 9/2000 | Kay | G10H 1/00 84/445 |

(Continued)

FOREIGN PATENT DOCUMENTS

JP    2008-89643 A    4/2008

OTHER PUBLICATIONS

"Yamaha Motif XS", Keyboard Magazine, May 24, 2011, New Bay Media, LLC, New York, NY (Available online at http://www.keyboardmag.com/article/Yamaha-Motif-XS/4317, downloaded Jun. 19, 2013).

(Continued)

*Primary Examiner* — David Warren
*Assistant Examiner* — Christina Schreiber
(74) *Attorney, Agent, or Firm* — Blank Rome LLP

(57) ABSTRACT

Systems, methods, and non-transitory computer-readable storage media generate customized arpeggios. An exemplary method includes providing a storage medium, including a database storing data corresponding to an arpeggio pattern to be played by a virtual instrument. The method further includes receiving a plurality of user inputs that enable a user to select a desired set of musical notes (e.g. a chord) other than the notes (e.g. chord) used to create the arpeggio stored in the database, without having to re-enter the note sequence. The method then includes creating the desired arpeggio for the selected set of notes by applying the stored arpeggio data from the database to the entered notes, and playing the created desired arpeggio.

21 Claims, 5 Drawing Sheets

(56) References Cited

U.S. PATENT DOCUMENTS

| | | | |
|---|---|---|---|
| 6,166,316 A * | 12/2000 | Takahashi | G10H 1/28 84/619 |
| 6,919,502 B1 * | 7/2005 | Yamamoto | G10H 1/0066 84/622 |
| 7,091,410 B2 * | 8/2006 | Ito | G10H 1/28 84/638 |
| 7,432,436 B2 * | 10/2008 | Ito et al. | 84/638 |
| 7,432,437 B2 * | 10/2008 | Ito | G10H 1/28 84/626 |
| 9,087,500 B2 * | 7/2015 | Sumi | G10H 1/0008 |
| 9,105,260 B1 * | 8/2015 | Helms | G10H 1/386 |
| 2001/0032539 A1 * | 10/2001 | Chantzis | G09B 15/04 84/478 |
| 2003/0131715 A1 * | 7/2003 | Georges | G10H 1/0025 84/609 |
| 2003/0188625 A1 * | 10/2003 | Tucmandl | G10H 1/0025 84/609 |
| 2005/0016366 A1 * | 1/2005 | Ito | G10H 1/28 84/716 |
| 2007/0071205 A1 * | 3/2007 | Loudermilk | G10H 1/0025 379/162 |
| 2007/0261535 A1 * | 11/2007 | Sherwani | G10H 1/0025 84/609 |
| 2008/0072744 A1 * | 3/2008 | Ito | G10H 1/28 84/638 |
| 2008/0072745 A1 * | 3/2008 | Ito | G10H 1/28 84/638 |
| 2008/0127813 A1 * | 6/2008 | Ito | G10H 1/28 84/638 |
| 2008/0302233 A1 * | 12/2008 | Ding | G09B 15/002 84/609 |
| 2008/0307945 A1 * | 12/2008 | Gatzsche | G09B 15/023 84/477 R |
| 2015/0013532 A1 * | 1/2015 | Adam | G01H 1/28 84/638 |

OTHER PUBLICATIONS

US 7,943,842, 05/2011, Georges et al. (withdrawn)

* cited by examiner

US 9,384,719 B2

GENERATING CUSTOMIZED ARPEGGIOS IN A VIRTUAL MUSICAL INSTRUMENT

BACKGROUND

1. Technical Field

The disclosed technology relates generally to virtual musical instruments.

2. Introduction

Virtual musical instruments, such as MIDI-based or software-based keyboards, guitars, strings, or horn ensembles can include an arpeggiator that allows a user to create an arpeggio by entering multiple notes (e.g. a chord) on a MIDI-based instrument, such as a keyboard, in a particular sequence or pattern. For simplification of explanation, a MIDI keyboard will be used as an example in the following disclosure. However, it will be understood that the following disclosure may be applied to any MIDI- or software-based instrument, such as a guitar, other string instrument, horn, woodwind, etc. The arpeggiator then arpeggiates the entered chord, by continuing to play the notes in the order that they were entered on the keyboard for as long as the notes are held by the user. As a note is released from the keyboard, it is removed from the played arpeggio. Similarly, as a note is entered on the keyboard, it is added to the played arpeggio. The resulting arpeggio continues to play the currently held notes in the order that they were entered.

However, once the user releases all notes, the arpeggiation ends. Thus, for example, if a user wishes to arpeggiate a completely different set of notes (i.e. a different chord) in same pattern, the user must enter those notes in the desired sequence and hold them for the arpeggiator to play the arpeggio. Therefore, a need exists to generate a customized arpeggio according to user's input. More specifically, a need exists to memorize a custom note order entered by a user, which can be then applied to a different set of notes.

SUMMARY

Disclosed are systems, methods, and non-transitory computer-readable storage media for generating customized arpeggios. An exemplary method includes providing a storage medium, including a database storing data corresponding to an arpeggio or note order pattern to be played by a virtual instrument. The method further includes receiving a plurality of user inputs that enable a user to select a desired set of musical notes (e.g. a chord) other than the notes (e.g. chord) used to create the arpeggio stored in the database, without having to re-enter the note sequence. The method then includes creating the desired arpeggio for the selected set of notes by applying the stored arpeggio note order data from the database to the entered notes, and playing the created desired arpeggio.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
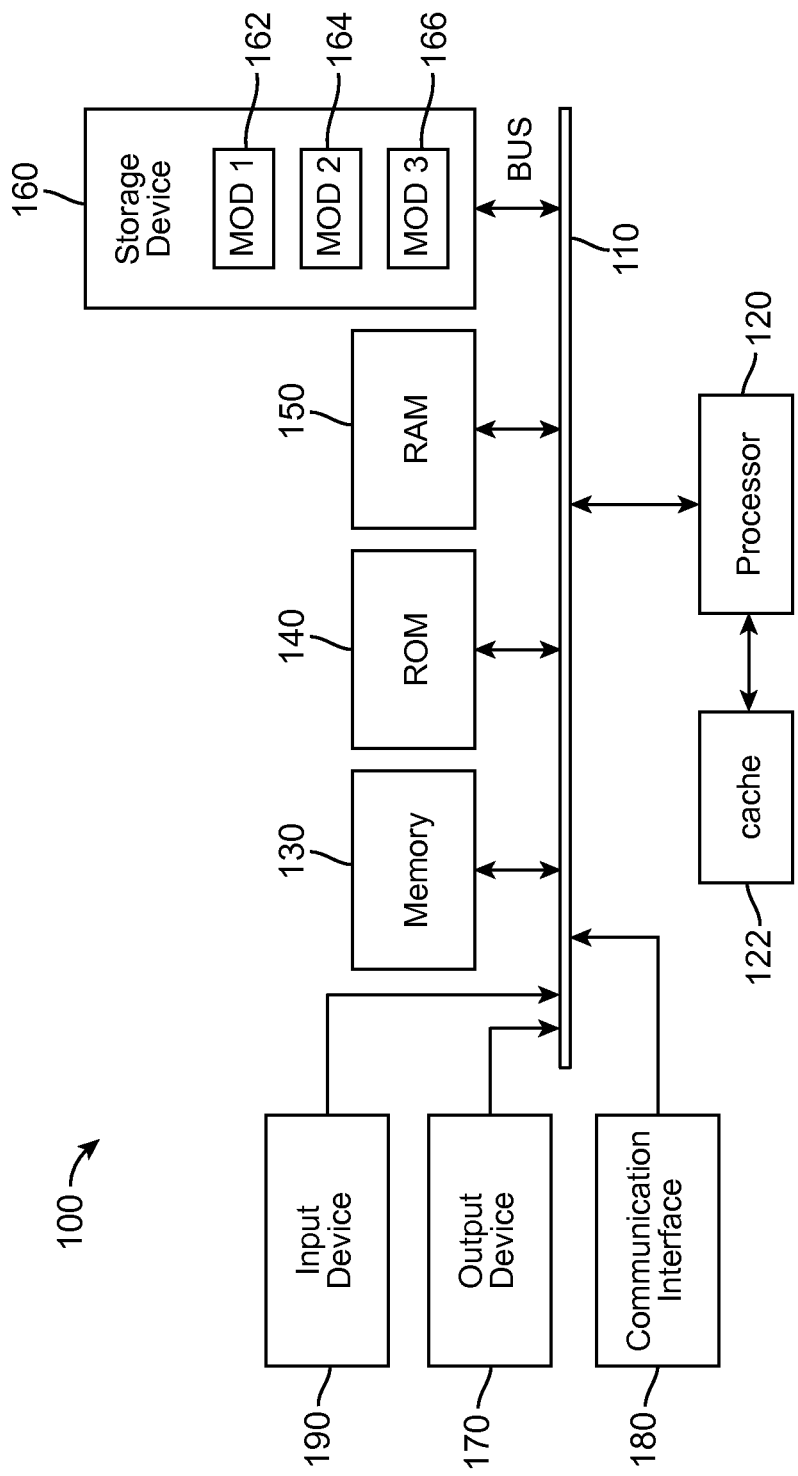
FIG. 1 illustrates an example system embodiment.

A brief introductory description of a basic general purpose system or computing device in FIG. 1 which can be employed to practice the present disclosure is disclosed herein.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output system (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein can employ the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod 1 162, Mod 2 164 and Mod 3 166 which are modules configured to control the processor 120. These modules may be stored on the storage device 160 and loaded into RAM 150 or memory 130 at runtime or may be stored as would be known in the art in other computer-readable memory locations.

Figure 2:
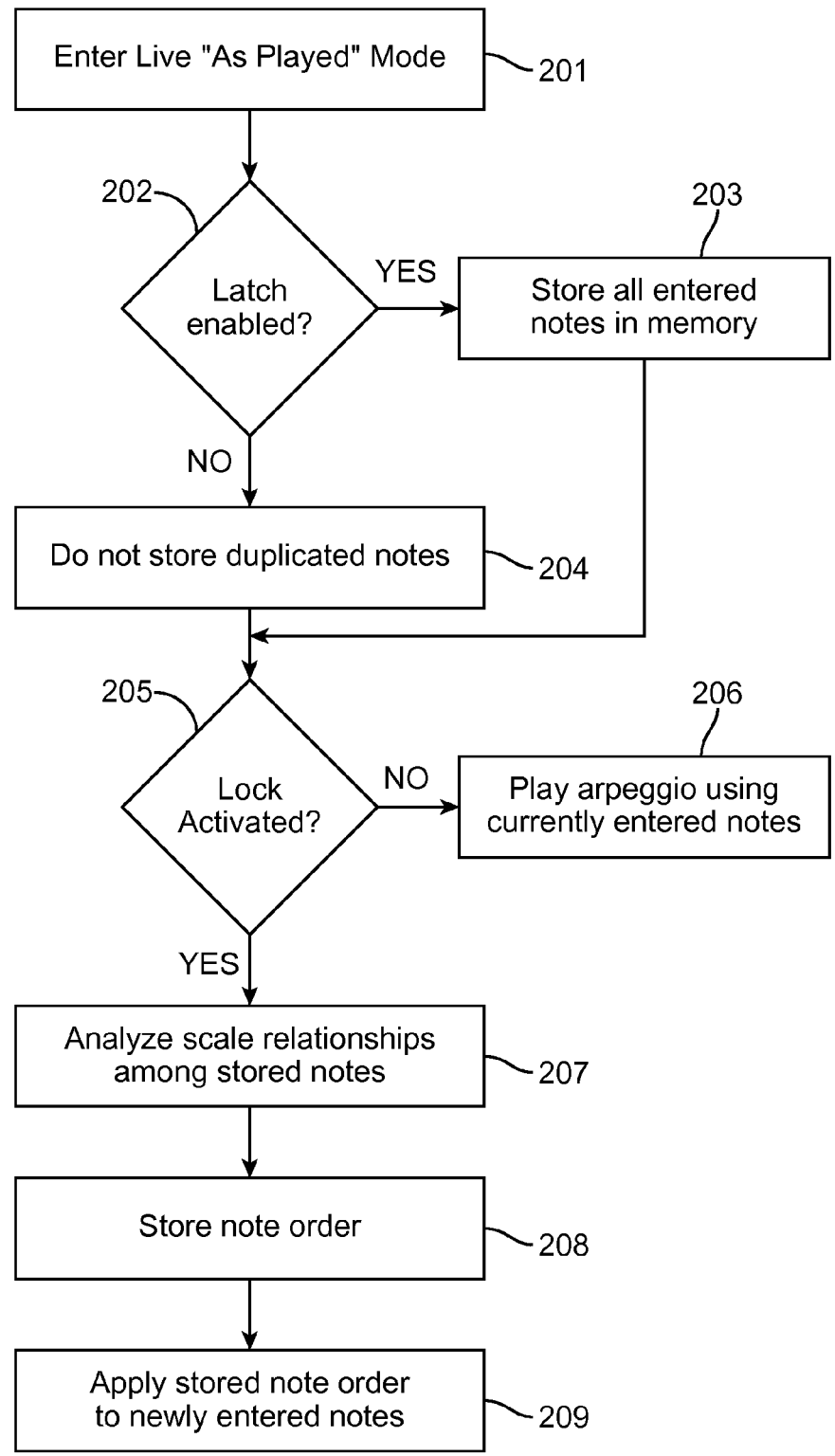
FIG. 2 illustrates a flow diagram of a method according to the present disclosure.
Figure 3:
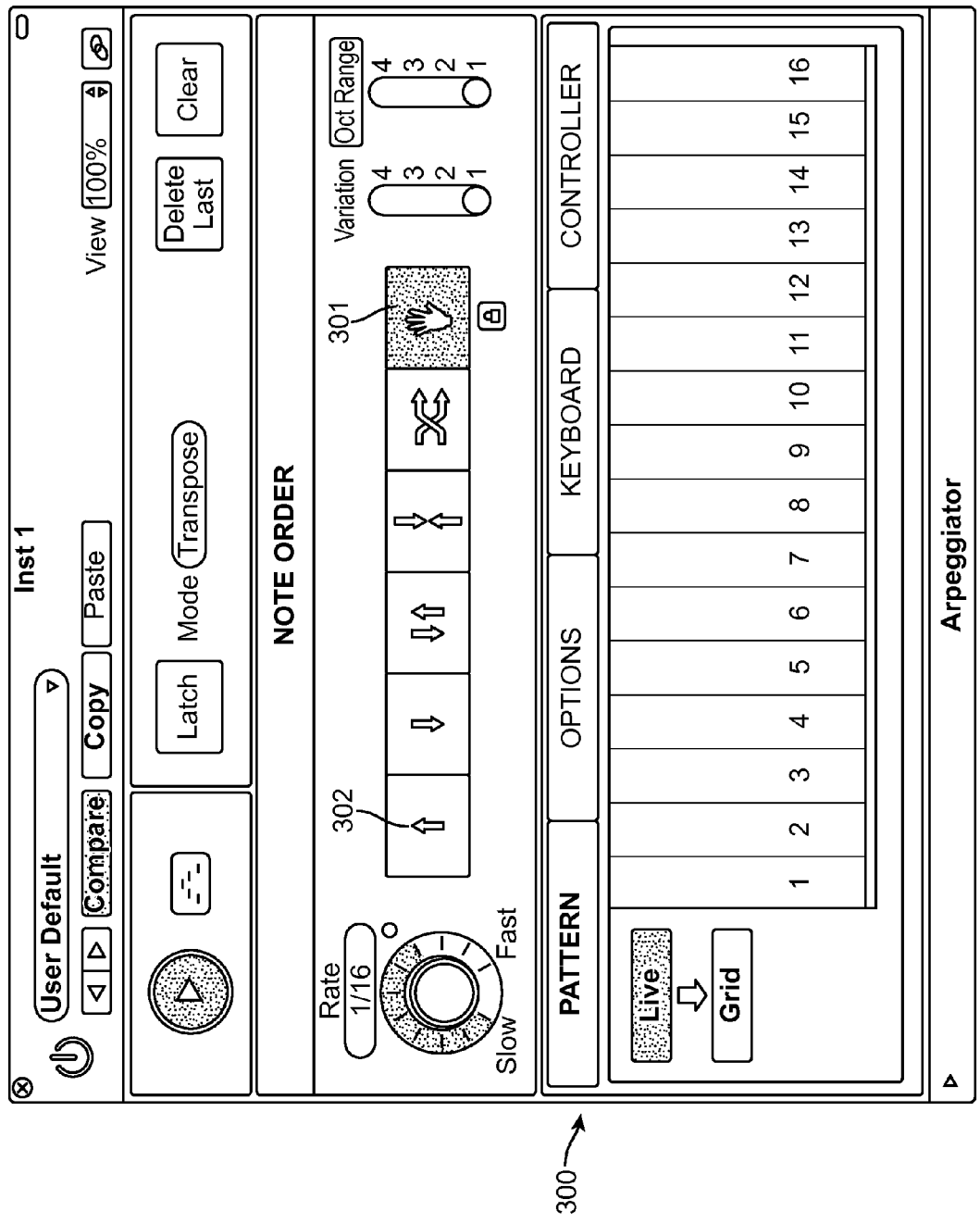
FIG. 3 illustrates a graphical user interface of an arpeggiator showing a live mode according to the present disclosure.

FIG. 2 illustrates a flow diagram of an exemplary method carried out using the arpeggiator of the present disclosure. At step 201, the user selects the As Played or Live mode (see FIG. 3, icon 301 of arpeggiator interface 300) and creates an arpeggio by playing sequential notes on a keyboard. At step 202, the user may enable the arpeggiator Latch mode (see FIG. 4, icon 401) to more easily build long arpeggios including repeating notes. In Latch mode, at step 203 notes that are released are not removed but stay in the arpeggiator memory. If the Latch mode is not entered, then the process advances to step 204 wherein duplicated notes are not stored in memory.

Figure 4:
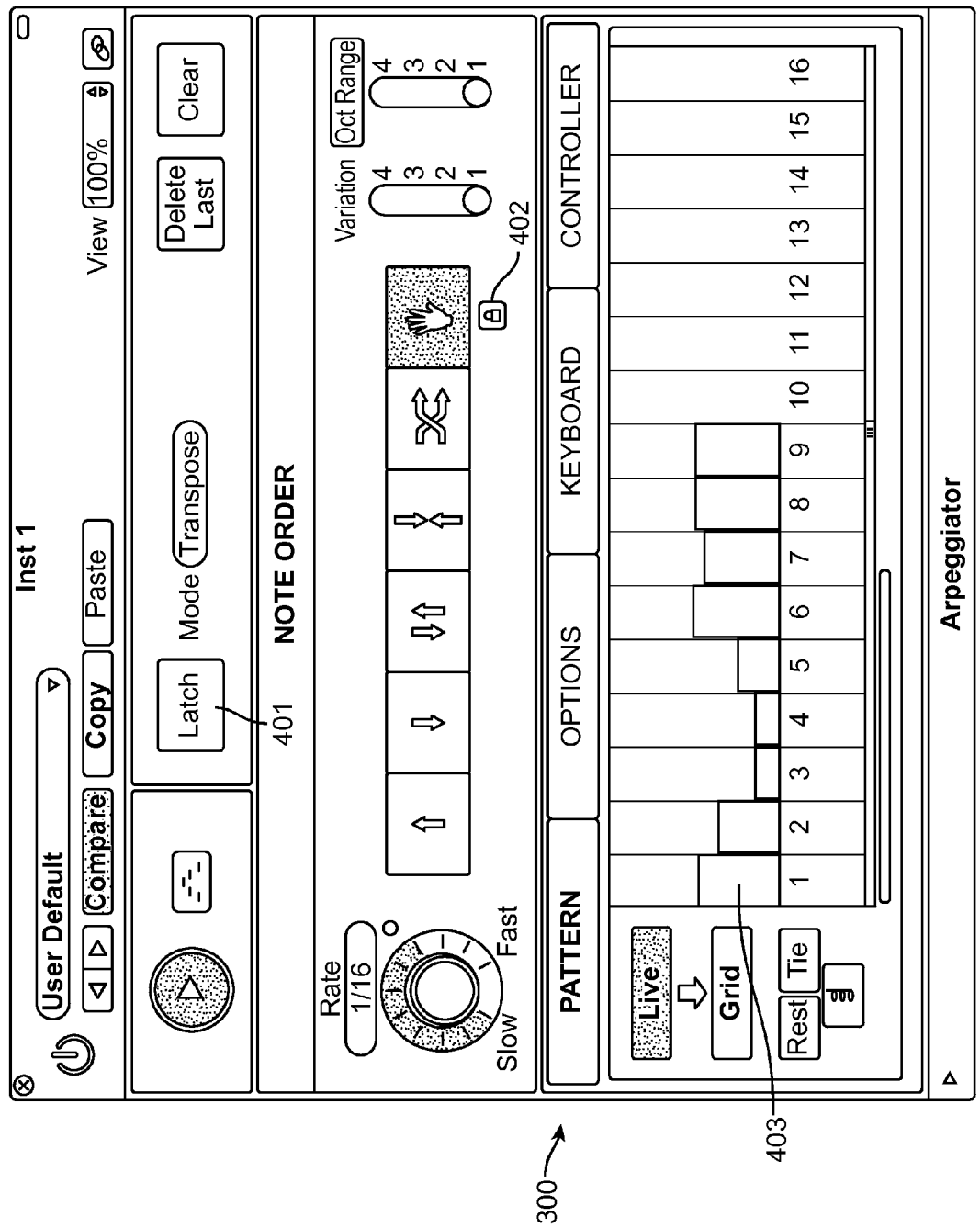
FIG. 4 illustrates a graphical user interface of an arpeggiator showing a grid mode according to the present disclosure.

To preserve the current note order (e.g., pitch order), at step 205 the user clicks on the Lock symbol icon 402 (see FIG. 4). For as long as the lock is active, the preserved note order (see 403, FIG. 4) is not reset by any action other than disengaging the memory lock 402; when the lock 402 is deactivated or not activated, at step 206 the arpeggiator plays arpeggios using the notes currently entered and held by the user. The lock function allows the user to enter any series of notes 403 without losing the overall melodic progression. In this respect the locked As Played mode behaves in the same manner as the other Note Order preset buttons 302 such as Up, Down, Up&Down, Invert, Shuffle . . . etc. with the important difference that the lock function is in effect a user-programmable preset. The locked As Played note order is saved with the plug-in setting, wherein the arpeggiator 300 is implemented as a plug-in to a virtual instrument such as a software-based keyboard.

As an example, after activating the As Played mode button 301 the user plays a C major dominant 7th chord in the order: C-G-E-Bb. These notes are stored in sequence in memory, and the arpeggiator repeatedly plays the notes in the order they were entered, so long as the notes are held by the user.

At step 205 the user activates the Lock button 402; the arpeggiator then advances to step 207, wherein it analyzes the pitch or scale relationships among the notes to derive and memorize a series of playing instructions. Thus, using the notes entered, the arpeggiator generates instructions, with respect to any set of four notes later entered, to first play the lowest of the four notes, second play the third lowest (second highest) note of the four notes, third play the second lowest (third highest) note of the four notes, and fourth play the highest note of the four notes. In short, the custom note order is: 1, 3, 2, 4. This pitch or scale order or sequence is then stored in memory at step 208.

At step 209, the note order instructions are applied to all subsequently notes entered by the user. For example, if the user next plays an A Minor7 chord by entering in any order the notes A-C-E-G. According to the memorized playing instructions the notes are arpeggiated in the following order: A, E, C, G.

When generating a custom arpeggio by using note order 'As Played' in combination with the Latch mode, it is quite likely that only a few different notes are played, but in a specific pattern or sequence. For example, the intro theme of the song Tubular Bells contains the following note 'MIDI Note Name' terms: E4, A4, E4, H4, E4, G4, A4, E4, C5, E4, D5, E4, H4, C5, E4, A4, E4, H4, E4, G4, A4, E4, C5, E4, D5, E4, H4, C5, E4, H4. This is a pattern of 30 steps, but with only 6 different notes (E4, G4, A4, H4, C5, D5). The custom playing order instructions that are generated and stored after activating the Lock function are: 1,3, 1,4, 1,2, 3, 1,5, 1,6, 1,4,5, 1,3, 1, 4, 1,2,3, 1,5, 1,6, 1,4,5, 1,4.

If the user thereafter plays a different set of six notes (regardless of sequence of entry), the melodic progression of the Tubular Bells intro would be retained, but using the different set of notes played.

Figure 5:
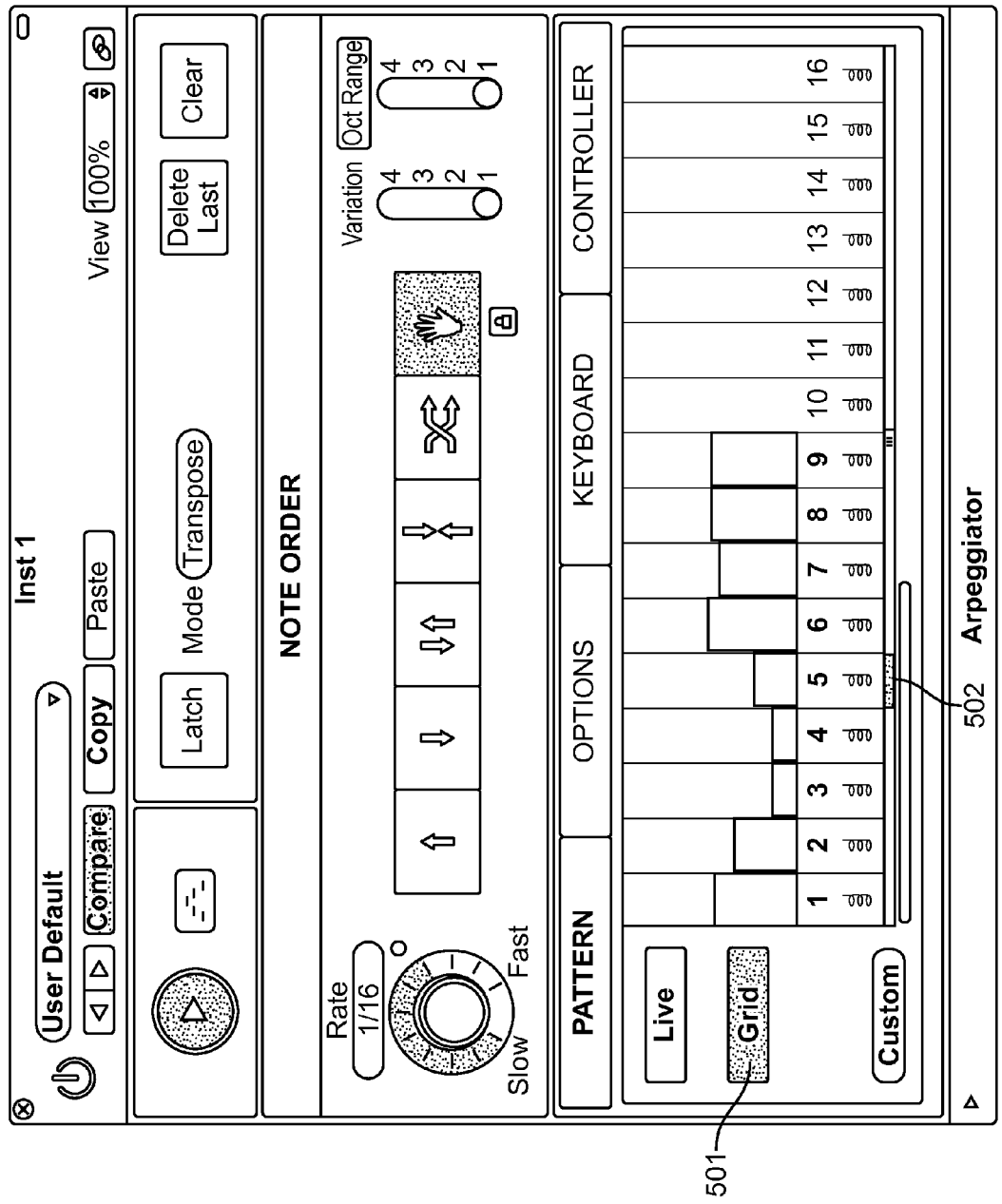
FIG. 5 illustrates a graphical user interface of an arpeggiator showing a custom grid mode according to the present disclosure.

Another embodiment of the present disclosure is now explained with respect to FIG. 5. Traditionally hardware arpeggiators were created as a live tool using the live keyboard playing as the source data for the note content, the note velocity etc. In software some manufacturers offered a different approach by providing the user with a step editor style grid. Using the grid the user is able to edit some arpeggiator performance parameters while the arpeggio is playing such as velocity, inserting pauses or ties and so on.

According to this aspect, it is possible to 'capture' the performance data of an arpeggio that was created by the live playing on a MIDI keyboard. The 'captured' performance data (e.g. velocity data) is written into a pattern grid 501 for subsequent graphical step editing. Using the pattern grid the user can change the velocities per step, turn arpeggiator steps into rests and ties and even adding steps to the arpeggio. In addition the user may save and load patterns. Thus, a pattern consists of the velocity data per step and the information of whether a step is played as a note, rest or tie. This information is used to articulate the currently held MIDI notes that are being arpeggiated. As an example, say the user plays a C Major7 chord hitting the MIDI keyboard with different velocities for each note of the chord, playing [C1, vel=112], [E1, vel=80], [G1, vel=50], [B1, vel=90]. The chord notes are sorted and repeated according to the selected Note Order mode. In this case the user chooses the simple As Played Mode. The Arpeggiator plays [C1,vel=112], [E1,vel=80], [G1,vel=50], [B1, vel=90]. While the arpeggio is playing the user clicks on a 'capture' icon (such an arrow glyph pointing at the grid).

The played velocities are captured: [Step1, vel=112], [Step2, vel=80], [Step3, vel=50], [Step4, vel=90]—The user now edits the captured grid pattern (502): [Step1, vel=100], [Step2, vel=70], [Step3,rest], [Step4,vel=90]. Now the user plays an A Minor7 chord with varying velocities. The arpeggiator ignores the velocities played by the user, instead using the data in the grid. The A Minor7 chord is arpeggiated as follows [A1, vel=100], [C2,vel=70], [rest], [G2,vel=90].

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A graphical programming interface system for a virtual musical instrument, comprising:
 a display;
 a processor;
 a storage medium;
 a user input that enables a user to input one or more notes to be stored in said database; and a set of processor-executable instructions stored in said storage medium, said instructions causing the processor to perform operations comprising:
analyze a first plurality of notes received from the user input to determine a desired non-monotonic pitch sequence;
store a second plurality of notes received from the user input;
arrange the second plurality of notes in an order corresponding to the desired non-monotonic pitch sequence; and
play the second plurality of notes in the order corresponding to the desired non-monotonic pitch sequence.

2. The graphical programming interface system as set forth in claim 1, wherein said desired non-monotonic pitch sequence comprises at least three notes.

3. The graphical programming interface system as set forth in claim 1, wherein the user input includes a selectable graphical icon in response to activation of which the system stores said desired non-monotonic pitch sequence in said database.

4. The graphical programming interface system as set forth in claim 1, wherein said desired non-monotonic pitch sequence includes at least one repeated pitch, and the user input includes a selectable graphical icon in response to activation of which the system stores a desired non-monotonic pitch sequence including at least one repeated pitch in said database.

5. The graphical programming interface system as set forth in claim 1, wherein the user input includes a musical instrument interface that enables a user to input the one or more notes by actuating notes on said interface.

6. The graphical programming interface system as set forth in claim 5, wherein the musical instrument interface comprises a MIDI keyboard.

7. The graphical programming interface system as set forth in claim 5, further comprising computer-executable instructions for storing a velocity of an inputted note on said musical instrument interface.

8. The graphical programming interface system as set forth in claim 7, further comprising computer-executable instructions for storing a sequence of velocities of inputted notes on said musical instrument interface.

9. The graphical programming interface system as set forth in claim 8, further comprising computer-executable instructions that enable modification of stored velocity values through user input.

10. A method of creating an arpeggio pattern for a software-based musical instrument, comprising,
storing a sequence of a plurality of notes as entered by a user in an arpeggio mode of said instrument;
analyzing pitch relationships among said sequence of notes;
creating a non-monotonic pitch sequence corresponding to said pitch relationships;
storing the non-monotonic pitch sequence;
analyzing pitch relationships among a second plurality of notes entered by a user through said instrument;
applying said stored non-monotonic pitch sequence to the second plurality of notes by arranging the second plurality of notes in an order that corresponds to the stored non-monotonic pitch sequence; and
playing the second plurality of notes according to the applied stored non-monotonic pitch sequence.

11. The method of claim 10, wherein the sequence of a plurality of notes contains at least one duplicate note.

12. The method of claim 10, where notes are entered through a MIDI keyboard.

13. The method of claim 10, further comprising detecting velocities of entered notes of the sequence of plurality of notes, storing a sequence of velocities together with the stored non-monotonic pitch sequence, and playing the second plurality of notes in accordance with the stored velocities.

14. The method of claim 13, further comprising modifying stored velocities in response to user input.

15. A computer program product comprising a non-transitory computer readable storage medium storing a plurality of computer-executable instructions for applying a pitch sequence to a plurality of notes entered on a virtual musical instrument embodied in an electronic processing device, the computer-executable instructions comprising instructions for:
creating desired non-monotonic pitch sequence data in response to input signals corresponding to notes entered on said instrument;
storing the desired non-monotonic pitch sequence data in a database;
applying stored desired non-monotonic pitch sequence data to a plurality of notes inputted on the virtual instrument; and
playing the inputted plurality of notes in an order corresponding to the desired non-monotonic pitch sequence indicated by the stored desired non-monotonic pitch sequence data.

16. The computer program product as set forth in claim 15, further comprising computer-executable instructions for storing a velocity of an inputted note on said musical instrument.

17. The computer program product as set forth in claim 16, further comprising computer-executable instructions for storing a sequence of velocities of inputted notes on said musical instrument.

18. The computer program product as set forth in claim 17, further comprising computer-executable instructions that enable modification of stored velocity values through user input.

19. A computer program product comprising a non-transitory computer readable storage medium storing a plurality of computer-executable instructions for applying a pitch sequence to a plurality of notes entered on a virtual musical instrument embodied in an electronic processing device, the computer-executable instructions comprising instructions for:
storing a sequence of a plurality of notes as entered by a user in an arpeggio mode of said instrument;
analyzing pitch relationships among said sequence of notes;
creating a non-monotonic pitch sequence corresponding to said pitch relationships;
storing the non-monotonic pitch sequence;
analyzing pitch relationships among a second plurality of notes entered by a user through said instrument;
applying said stored non-monotonic pitch sequence to the second plurality of notes by arranging the second plurality of notes in an order that corresponds to the stored non-monotonic pitch sequence; and
playing the second plurality of notes according to the applied stored non-monotonic pitch sequence.

20. The computer program product of claim 19, further comprising computer-executable executable instructions for storing a velocity of an inputted note on said musical instrument.

21. The computer program product of claim 20, further comprising computer-executable instructions for storing a sequence of velocities of inputted notes on said musical instrument.

\* \* \* \* \*